(12) United States Patent
Nishikawa et al.

(10) Patent No.: US 6,236,133 B1
(45) Date of Patent: May 22, 2001

(54) THREE-PHASE BRUSHLESS MOTOR

(75) Inventors: Yoshihito Nishikawa, Toyohashi; Mitsuhiko Matsushita, Ogasa-gun, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/533,859

(22) Filed: Mar. 24, 2000

(51) Int. Cl.[7] .................................................. H02K 1/00
(52) U.S. Cl. ........................ 310/179; 310/185; 310/186; 310/187
(58) Field of Search ................................. 310/179, 186, 310/269, 156, 185, 181, 196, 187

(56) References Cited

U.S. PATENT DOCUMENTS 5,986,376 * 11/1999 Werson ................................. 310/186
6,034,460 * 11/1999 Tajima et al. ........................ 310/179

FOREIGN PATENT DOCUMENTS

B2-8-8764 5/1987 (JP) .
B2-2743918 6/1997 (JP) .

* cited by examiner

Primary Examiner—Nestor Ramirez
Assistant Examiner—Thanh Lam
(74) Attorney, Agent, or Firm—Law office of David G. Posz

(57) ABSTRACT

A brushless motor is composed of a stator for generating a rotating magnetic field by supplying three-phase alternating current consisting of U, V and W-phases thereto and a rotor having plural poles and rotatably disposed inside the stator. The rotor is rotated by the rotating magnetic field generated in the stator. The stator includes core teeth on which coils are wound. A tooth-group consisting of a center tooth and two side teeth is allocated to each phase, and excitation current in one phase is simultaneously supplied to three coils wound on the three teeth in the same tooth-group. The center teeth of each phase are positioned with equal intervals therebetween, while the side teeth are positioned so that they substantially coincide with the centers of the rotor poles when a center tooth in the same tooth-group coincides with the center of one of the rotor poles. Thus, the phase shift among the three coils in each phase is substantially eliminated, and thereby the excitation current is efficiently converted into the rotating magnetic field and output of the brushless motor is increased.

9 Claims, 3 Drawing Sheets

THREE-PHASE BRUSHLESS MOTOR

BACKGROUND OF THE INVENTION

1. Field of the Invention

The present invention relates to a three-phase brushless motor, and more particularly to a structure of stator teeth relative to permanent magnet rotor poles.

2. Description of Related Art

An example of a conventional brushless motor 1 is schematically shown in FIG. 2. The brushless motor 1 is composed of a stator 2 and a rotor 6 rotatably supported inside the stator 2. The stator 2 includes an outer core ring 3, an inner core ring 4 having nine teeth 4a–4i and connected to the outer core ring 3, and three-phase coils wound around respective teeth. The three-phase coils consist of U-phase coils 5U (5U1, 5U2 and 5U3), V-phase coils 5V (5V1, 5V2 and 5V3) and W-phase coils 5W (5W1, 5W2 and 5W3). The nine teeth 4a–4i extend in the radial direction from the inner core ring 4 with an equal central angle of 40° between two neighboring teeth. The U-phase coils 5U1, 5U2 and 5U3 are respectively wound around the first tooth 4a, the second tooth 4b and the third tooth 4c. Similarly V-phase coils 5V1–5V3 are respectively wound around the fourth to sixth teeth 4d–4f, and W-phase coils 5W1–5W3 are respectively wound around the seventh to ninth teeth 4g–4i. The coils around the first, third, fourth, sixth, seventh and ninth teeth are wound in a first direction, and other coils around the second, fifth and eighth teeth are wound in the second direction which is opposite to the first direction. After all the coils are wound on the respective teeth of the inner core ring 4, the inner core rings 4 is connected to the outer core ring 3 as shown in FIG. 2. The stator 2 thus assembled is housed in a housing (not shown).

The rotor 6 composed of a shaft 7 and a permanent magnet 8 is rotatably housed in the housing and held inside the stator 2 with a certain air gap therebetween. The permanent magnet 8 is magnetized into eight poles, an N pole and an S pole being alternately formed with an equal central angle of 45° between two neighboring poles.

Three-phase alternating excitation current consisting of U, V, and W phases having 120° phase difference from each other is supplied to the respective coils, i.e., the U-phase coils 5U, the V-phase coils 5V and the W-phase coils 5W. A rotating magnetic field is generated in the stator 2 by the three-phase alternating excitation current, and thereby the rotor 6 rotates relative to the stator 2. As disclosed in JP-B2-8-8764, if the number of magnet poles P is set to 8n (n is an integer equal to or larger than 1), and the number of teeth T is set to 9n, a ripple frequency of a cogging torque becomes relatively high. Since the amount of the cogging torque is inversely proportional to the ripple frequency, it is possible to reduce the cogging torque and thereby to realize a low vibration motor by thus selecting the number of magnet poles P and the number of teeth T. In the example shown in FIG. 2, n is one, and therefore P=8 and T=9.

In the stator structure shown in FIG. 2, the center of a tooth does not always coincide with the center of a magnet pole. For example, when the center of the second tooth 4b coincides with the center of an N-pole as shown in FIG. 2, the centers of the first tooth 4a and the third tooth 4c shift from the centers of respective S-poles. This results in phase shifting among voltages V1, V2 and V3 induced in respective coils 5U1, 5U2 and 5U3 of the U-phase, as shown in FIG. 3. That is, the phase of V1 is advanced from the phase of V2 by 20° in electrical angle, and the phase of V3 is delayed from the phase of V2 by 20° in electrical angle. Therefore, though a peak voltage of each voltage V1, V2 and V3 is 1.0, a composite voltage V0 does not reach 3.0, but it only reaches 2.879. As shown in FIG. 4, the level of the composite voltage V0 becomes lower as the phase shift among V1, V2 and V3 becomes larger. The same is similarly applied to other phases, the V-phase and the W-phase. Accordingly, the excitation current supplied to the stator coils is not effectively utilized for generating the rotating field in the conventional motor. This has been a problem in realizing a high efficiency motor in a compact size.

SUMMARY OF THE INVENTION

The present invention has been made in view of the above-mentioned problem, and an object of the present invention is to provide an improved brushless motor having high power without increasing its size, and more particularly to provide an improved structure in the stator of the brushless motor.

The brushless motor is composed of a stator for generating a rotating magnetic field by supplying three-phase alternating current consisting of U, V and W phases and a rotor rotatably disposed inside the stator. The rotor has a magnet magnetized into 8 poles including N-poles and S-poles alternately positioned with equal intervals therebetween.

The stator is composed of a core having nine teeth and coils wound around the teeth. Of the 9 teeth, the first 3 teeth are allocated to the U-phase, the second 3 teeth to the V-phase, and the third 3 teeth to the W-phase. Each group of 3 teeth consists of a center tooth, a first side tooth and a second side tooth, both side teeth being located at both sides of the center tooth, respectively.

Three center teeth, each respectively corresponding to the U, V and W phase, are positioned with an equal interval angle therebetween, i.e., the interval angle $\theta_1$ is 120°, measured in a central angle. The first and second side teeth are respectively positioned $\theta_2$ apart from the center tooth, where $\theta_2$ falls in a range larger than 40° and not larger than 45° measured in a central angle. Preferably, $\theta_2$ is set to 45°. Coils corresponding to the U-phase are divided into three coils, one being wound around the center tooth and two being wound around the side teeth, respectively. Coils corresponding to other phases are similarly divided and wound.

By positioning the center tooth and side teeth in this manner, a phase difference among three coils is reduced, because when the center tooth coincides with one rotor pole, the side teeth substantially coincide with neighboring rotor poles. If $\theta_2$ is set to 45°, the center tooth and both side teeth exactly coincide with the respective centers of the rotor poles, and thereby the phase difference among three coils is completely eliminated. Since the phase difference is thus reduced or eliminated according to the present invention, excitation current supplied to the stator is effectively converted into the rotating magnetic field, and thereby output of the brushless motor is increased without making its size large.

The present invention is generally applicable to other three-phase brushless motors. That is, a brushless motor is designed and its teeth are positioned according to the following formulae. The number of rotor poles P: 8n (n is an integer equal to or larger than 1); the number of teeth T: 9n; $\theta_1=(120°/n)$; $(360°/T)<\theta_2\leq(360°/P)$. Preferably, $\theta_2$ is set to $(360°/P)$ to eliminate the phase difference among three coils of each phase.

Winding turns of the coil wound around the center tooth may be made larger than those of other coils, and/or a cross-sectional size of a wire forming the center coil may be made larger than that of other coils. In this manner, the output of the brushless motor can be further increased.

Other objects and features of the present invention will become more readily apparent from a better understanding of the preferred embodiment described below with reference to the following drawings.

DETAILED DESCRIPTION OF THE PREFERRED EMBODIMENT

Figure 1:
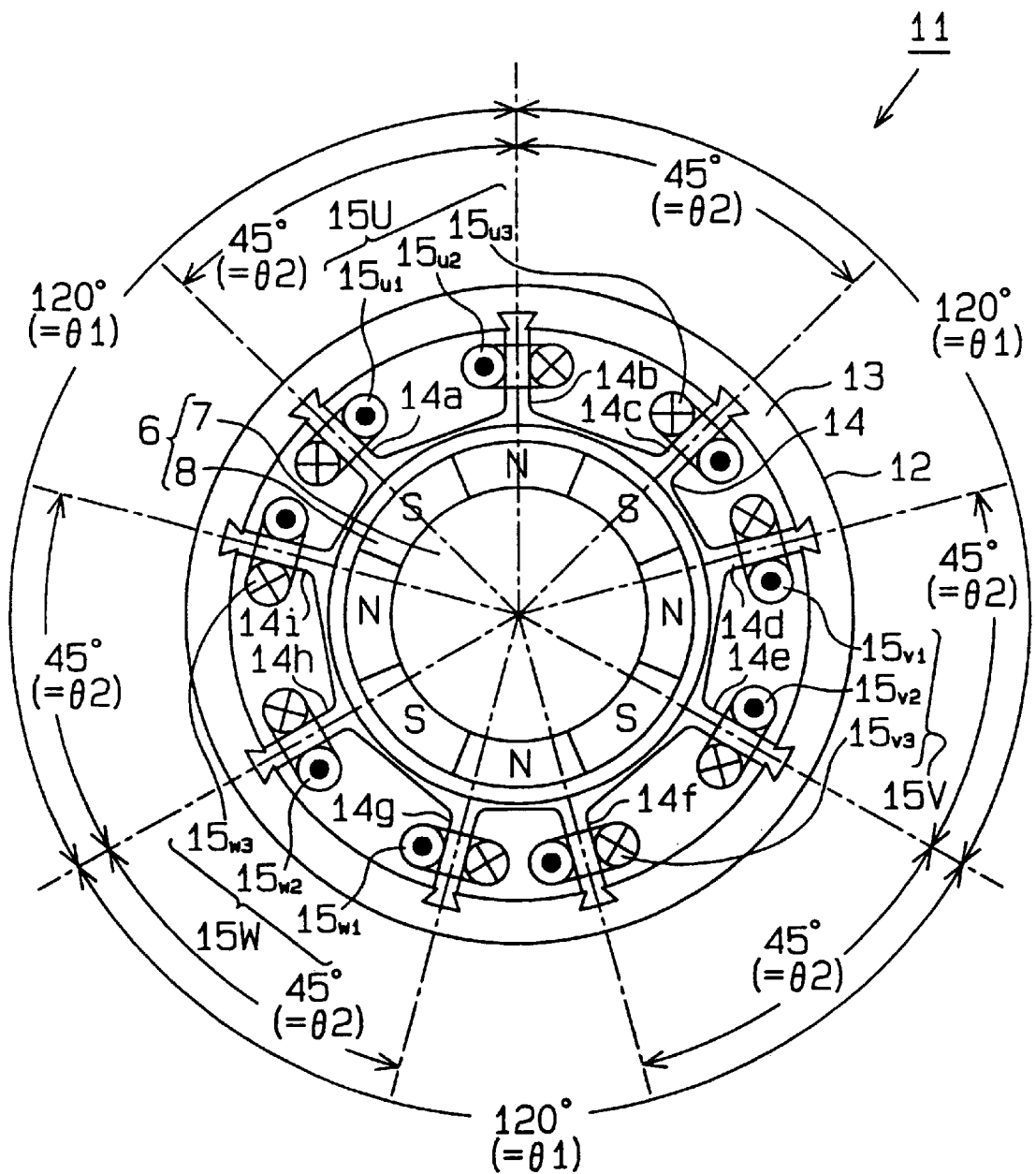
FIG. 1 is a schematic cross-sectional view showing a brushless motor according to the present invention.
Figure 2:
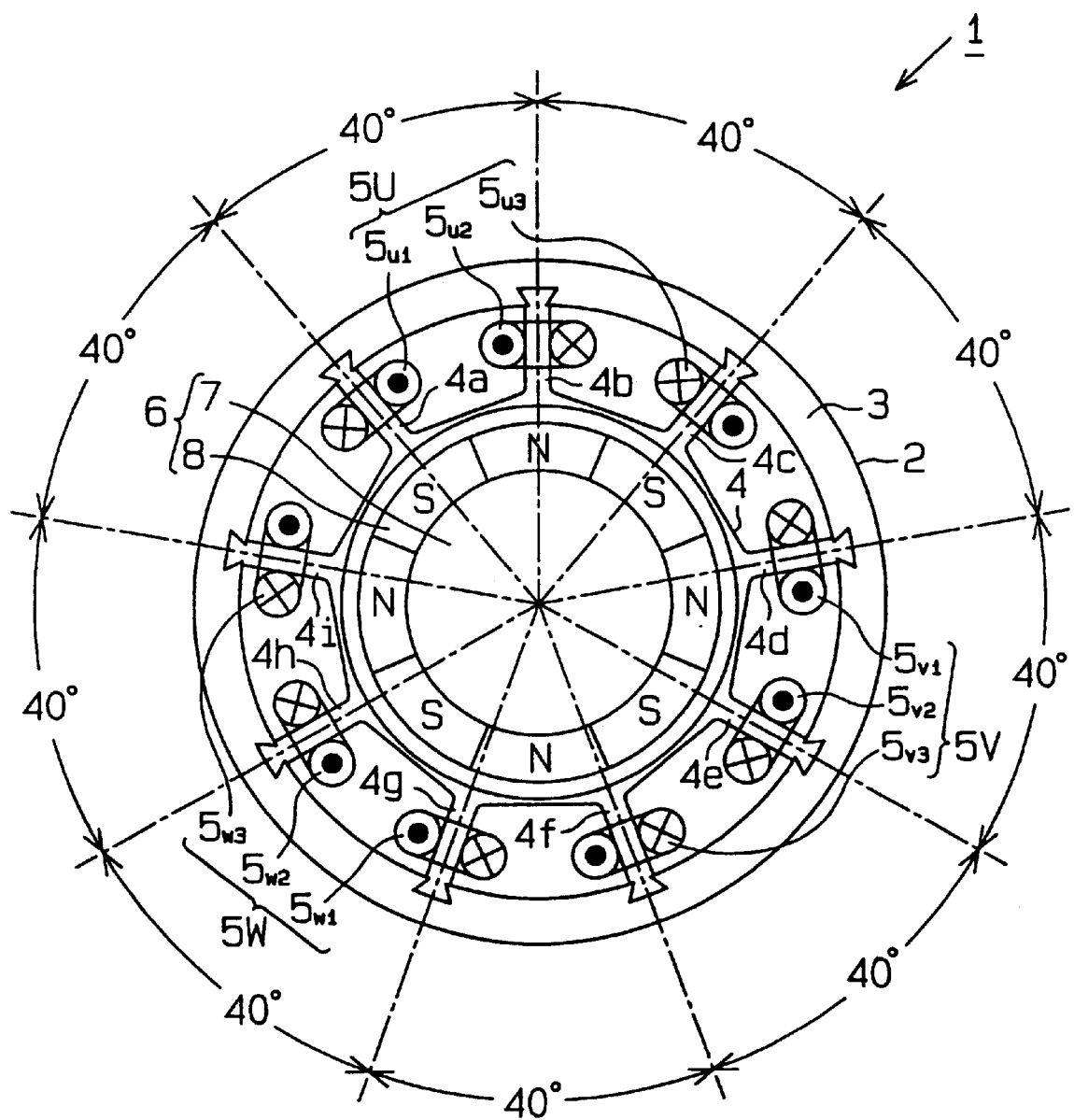
FIG. 2 is a schematic cross-sectional view showing a conventional brushless motor.

Referring to FIG. 1, a preferred embodiment of the present invention will be described. The same reference part numbers in FIG. 2 as those in FIG. 1 denote the same parts, respectively. In this embodiment, too, the number of magnet poles P is 8, and the number of stator teeth T is 9. Eight magnet poles are formed with equal intervals on a magnet 8, the N-pole and the S-pole being alternately positioned. That is, a central angle of each magnet pole is 45 degrees. However, stator teeth 14a–14i are not formed with equal intervals, but they are arranged in such a manner as described below.

A stator 12 is composed of an outer ring 13, an inner ring 14 connected to the outer ring 13, and coils 15U, 15V and 15W wound around teeth 14a–14i of the inner ring 14. The first to ninth teeth 14a–14i extend in the radial direction from the inner ring 14. Coils 15U1, 15U2 and 15U3 constituting U-phase coils 15U are wound around the first tooth 14a, the second tooth 14b and the third tooth 14c, respectively. Similarly, coils 15V1, 15V2 and 15V3 constituting V-phase coils 15V are wound around the fourth tooth 14d, the fifth tooth 14e and the sixth tooth 14f, respectively. Coils 15W1, 15W2 and 15W3 constituting W-phase coils 15W are wound around the seventh tooth 14g, the eighth tooth 14h and the ninth tooth 14i, respectively.

The second tooth 14b, the fifth tooth 14e and the eighth tooth 14h, each being a center tooth of each phase, are positioned with an equal interval from each other, i.e., with a central angle of 120 degrees. The first tooth 14a and the third tooth 14c are positioned at both sides of the U-phase center tooth 14b with a 45-degree interval from the center tooth 14b. The fourth tooth 14d and the sixth tooth 14f are positioned at both sides of the V-phase center tooth 14e with a 45-degree interval therefrom. The seventh tooth 14g and the ninth tooth 14i are positioned at both sides of the W-phase center tooth 14h with a 45-degree interval therefrom. As shown in FIG. 1, when the second tooth 14b (the U-phase center tooth) takes a position coinciding with the center of the N-pole, the first tooth 14a and the third tooth 14c coincide with the centers of the S-poles, respectively. This positional relation is similarly applicable to the teeth corresponding to the V-phase and the W-phase.

The coils 15U2, 15V2 and 15W2 on the respective center teeth 14b, 14e and 14h are wound in the first direction, while all other coils are wound in the second direction opposite to the first direction, as shown in FIG. 1. Three coils corresponding to each phase are connected in series, and those series-connected coils, each corresponding to each phase, are connected in a star-connection. That is, 15U1, 15U2 and 15U3 are connected in series thereby constituting the U-phase coils 15U; 15V1, 15V2 and 15V3 are connected in series thereby constituting V-phase coils; and 15W1, 15W2 and 15W3 are connected in series thereby constituting W-phase coils 15W. One end of 15U, 15V and 15W is connected to a common center of the star-connection, while three-phase excitation current is supplied to the coils from the other end thereof. The coil ends from which three-phase alternating excitation current is supplied stick out from one longitudinal side of the stator 12, so that work for connecting coils is easily carried out. In this particular embodiment, the number of turns of all the coils is the same, and a wire having the same cross-sectional area is commonly used for all the coils.

After the coils are wound around the stator teeth of the inner ring 14, the inner ring 14 is connected to the outer ring 13, so that wedge portions of the inner ring 14 firmly engage with wedge-shaped grooves formed on inner periphery of the outer ring 13. Then, the assembled stator 12 is housed in a housing. Since all the teeth are connected to each other by the inner ring 14, and the coils are fixed between the inner ring 14 and the outer ring 13, the cogging torque of the motor is suppressed.

Figure 3:
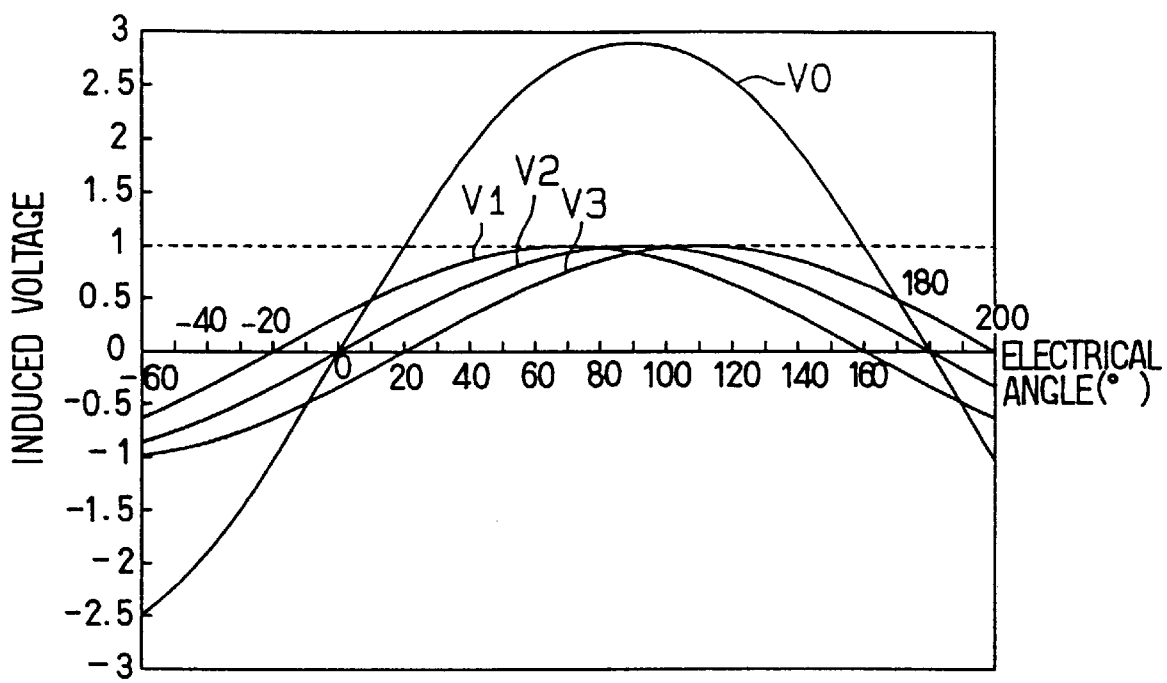
FIG. 3 is a graph showing induced voltages in U-phase coils and a composite voltage thereof in the conventional brushless motor shown in FIG. 2.
Figure 4:
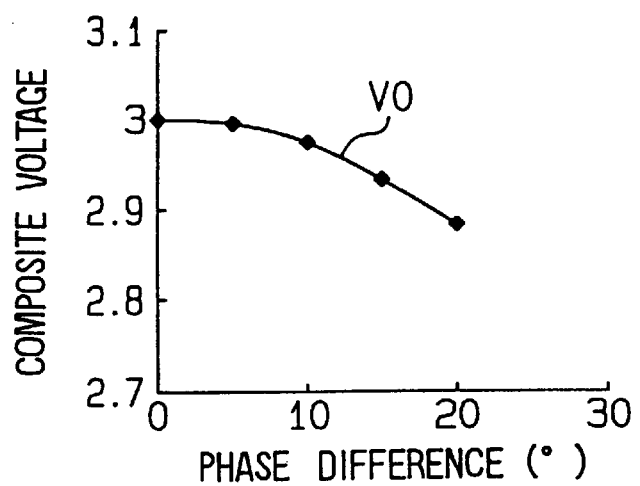
FIG. 4 is a graph showing a relation between phase shift among coils in each phase and a level of the composite voltage.

Three-phase alternating current, each phase being shifted by 120° in electrical angle, is supplied to the U-phase, V-phase and W-phase coils, and thereby a rotating magnetic field is generated on the stator 12. The rotor 6 is rotated relative to the stator 12 by the rotating magnetic field. When the second tooth 14b coincides with the center of the N-pole of the rotor 6, the first and third teeth 14a and 14c located at both sides of the second tooth 14b coincide with the respective centers of neighboring S-poles. Therefore, the phase shift among three induced voltages V1, V2 and V3 which appears in the conventional motor explained above referring to FIG. 3 is eliminated. Accordingly, the composite voltage V0 becomes 3.0 in this embodiment. This means that excitation current supplied to the stator 12 is effectively converted into the rotating magnetic field.

The present invention embodied in brushless motor having 8 rotor poles (P=8) and 9 stator teeth (T=9) can be generally applied to other brushless motors having 8n rotor poles (P=8n) and 9n stator teeth (T=9n), where n is an integer equal to or larger than 1. In applying the present invention to such a brushless motor, tooth-groups, each consisting of three teeth, are sequentially allocated to respective phases, i.e., the $1^{st}$, $2^{nd}$ and $3^{rd}$ teeth to the U-phase, the $4^{th}$, $5^{th}$ and $6^{th}$ teeth to the V-phase; the $7^{th}$, $8^{th}$ and $9^{th}$ teeth to the W-phase; the $10^{th}$, $11^{th}$, and $12^{th}$ teeth to the U-phase; the $13^{th}$, $14^{th}$ and $15^{th}$ teeth to the V-phase; $16^{th}$, $17^{th}$ and $18^{th}$ teeth to the W-phase; and so on. The excitation current in one phase is simultaneously supplied to all the coils corresponding to that phase. For example, the U-phase alternating current is simultaneously supplied to coils wound on the $1^{st}$, $2^{nd}$, $3^{rd}$; $10^{th}$, $11^{th}$, $12^{th}$; . . . teeth. The $2^{nd}$, $5^{th}$, $8^{th}$, $11^{th}$, $14^{th}$, $17^{th}$ . . . teeth are center teeth in the respective phases, U, V, W, U, V, W . . . .

The central angle between the neighboring center teeth θ1 is determined according to the following formula:

$$\theta 1 = (120°/n)$$

The central angle θ2 between a given center tooth and a tooth positioned to one side of the center tooth is determined according to the following formula:

$$(360°/T) < \theta 2 \leq (360°/P)$$

The center teeth and other teeth are positioned using θ1 and θ2 calculated as above. If θ2 equals to (360°/P), the phase difference among the induced voltages in the three coils in a phase becomes zero (0), thereby making the composite voltage maximum. This is because all the three teeth allocated to one phase coincide with the respective centers of magnet poles if $\theta2=(360°/P)$. As $\theta2$ approaches $(360°/T)$, the phase difference becomes larger, making the composite voltage lower.

In the embodiment shown in FIG. 1, the numbers and angles discussed above are set as follows: n=1; P=8; T=9; $\theta1=(120°/1)=120°$; and $\theta2=(360°/8)=45°$. Since $\theta2$ is set to 45° in this particular embodiment, both teeth 14a and 14c located at both sides of the central tooth 14b coincide with the center of S-poles when the center tooth 14b is positioned to coincides with the center of the N-pole located between both S-poles. Therefore, there is no phase difference among three coils 15U1, 15U2 and 15U3, and the composite voltage induced in the U-phase coils 15U becomes maximum. The same applies to other phases V and W, and the excitation current is effectively converted into the rotating magnetic field, making the conversion loss minimum. Though $\theta2$ is set to 45° in this particular embodiment, it is possible to make it smaller in a range larger than 40°.

The embodiment shown in FIG. 1 and described above may be variously modified. For example, the number of turns of center coils 15U2, 15V2 and 15W2 wound on the center teeth 14b, 14e and 14h, respectively, may be made larger than that of other coils, because the winding space available to those center coils is larger than that of other coils. In this manner, the composite voltages induced in coils 15U, 15V and 15W are made higher, resulting in a higher motor output. Further, the cross-section of the wire forming the central coils 15U2, 15V2 and 15W2 may be made larger than that of other coils, making its resistance lower. In this manner, power consumption in the motor is reduced. Though the rotor is disposed inside the stator in the embodiment described above, the rotor may be disposed outside the stator. This invention is equally applicable to such a brushless motor.

According to the present invention, as described above, the output of the brushless motor can be increased without making its size larger.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A three-phase brushless motor comprising:
   a rotor having a permanent magnet magnetized into P poles, the P poles being formed by alternately positioning N-poles and S-poles; and
   a stator having T teeth and three-phase coils consisting of U-phase coils, V-phase coils and W-phase coils, each coil being wound around the respective tooth, a rotating magnetic field being generated in the stator by supplying three-phase alternating current to the three-phase coils, wherein:
   P is 8n and T is 9n, where n is an integer equal to or larger than 1;
   tooth-groups, each group consisting of a center tooth, a first side tooth located at one side of the center tooth and a second side tooth located at the other side of the center tooth, are sequentially allocated to the U-phase coils, V-phase coils and W-phase coils;
   the coils of each phase consist of a center coil wound around the center tooth, a first side coil wound around the first side tooth and a second side coil wound around the second side tooth;
   the center teeth are positioned with an equal interval $\theta1$ from one another, where $\theta1=(120°/n)$, measured in a central angle; and
   each side tooth is positioned $\theta2$ apart from the center tooth, where $\theta2$ is measured in a central angle and $(360°/T)<\theta2\leq(360°/P)$.

2. The three-phase brushless motor as in claim 1, wherein:
   the central angle $\theta2=(360°/P)$.

3. The three-phase brushless motor as in claim 1, wherein:
   the center coil of each phase has more turns than the side coils.

4. The three-phase brushless motor as in claim 1, wherein:
   a cross-sectional area of a wire forming the center coil of each phase is larger than that of the side coils.

5. The three-phase brushless motor as in claim 1, 2, 3 or 4, wherein:
   the U-phase coils, V-phase coils and W-phase coils are connected to form a star-connection as a whole, first ends of those coils being connected to a common junction, and the three-phase alternating current being supplied from second ends thereof.

6. The three-phase brushless motor as in claim 1, 2, 3 or 4, wherein:
   the rotor is rotatably disposed inside the stator;
   the stator includes an outer ring and an inner ring; and
   all the teeth are firmly held between the outer ring and the inner ring.

7. The three-phase brushless motor as in claim 5, wherein:
   the stator is shaped in a hollow-cylinder having longitudinal end surfaces; and
   the second ends of the U-phase, V-phase and W-phase coils stick out from the same end surface of the stator.

8. A stator of a three-phase brushless motor, the brushless motor including a rotor having a permanent magnet magnetized into P poles, the P poles being formed by alternately positioning N-poles and S-poles, the stator comprising:
   a core having T teeth; and
   three-phase coils consisting of U-phase coils, V-phase coils and W-phase coils, each coil being wound around the respective tooth, a rotating magnetic field being generated in the stator by supplying three-phase alternating current to the three-phase coils, wherein:
   P is 8n and T is 9n, where n is an integer equal to or larger than 1;
   tooth-groups, each group consisting of a center tooth, a first side tooth located at one side of the center tooth and a second side tooth located at the other side of the center tooth, are sequentially allocated to the U-phase coils, V-phase coils and W-phase coils;
   the coils of each phase consist of a center coil wound around the center tooth, a first side coil wound around the first side coil and a second side coil wound around the second side coil;
   the center teeth are positioned with an equal interval $\theta1$ from one another, where $\theta1=(120°/n)$, measured in a central angle; and
   each side tooth is positioned $\theta2$ apart from the center tooth, where $\theta2$ is measured in a central angle and $(360°/T)<\theta2\leq(360°/P)$.

9. The stator of a three-phase brushless motor as in claim 8, wherein:
   the central angle $\theta2=(360°/P)$.

* * * * *

UNITED STATES PATENT AND TRADEMARK OFFICE
CERTIFICATE OF CORRECTION

PATENT NO.   : 6,236,133 B1
DATED        : May 22, 2001
INVENTOR(S)  : Yoshihito Nishikawa, Mitsuhiko Matsushita It is certified that error appears in the above-identified patent and that said Letters Patent is hereby corrected as shown below:

<u>Title page,</u>
Item [73], change the assignee from "Denso Corporation, Kariya (JP)" to -- Asmo Co., Ltd., Shizuoka (JP) --

Signed and Sealed this

Twenty-fifth Day of December, 2001

Attest:

JAMES E. ROGAN
*Attesting Officer*   *Director of the United States Patent and Trademark Office*